United States Patent [19]

Probst et al.

[11] Patent Number: 4,459,904
[45] Date of Patent: Jul. 17, 1984

[54] APPARATUS FOR BINDING BALES IN A BALING PRESS

[75] Inventors: Karl Probst, Solingen; Kurt Hüfken, Krefeld; Zvonko Goricanec, Düsseldorf, all of Fed. Rep. of Germany

[73] Assignee: Lindemann Maschinenfabrik GmbH

[21] Appl. No.: 460,362

[22] Filed: Jan. 24, 1983

[30] Foreign Application Priority Data

Jan. 25, 1982 [DE] Fed. Rep. of Germany ....... 3202183
Dec. 21, 1982 [DE] Fed. Rep. of Germany ....... 3247147

[51] Int. Cl.³ ............................................ B65B 13/28
[52] U.S. Cl. ........................................ 100/11; 100/31
[58] Field of Search ................... 100/11, 31, 19 R, 20, 100/21

[56] References Cited

U.S. PATENT DOCUMENTS 4,167,902 9/1979 Bister ................................... 100/11

FOREIGN PATENT DOCUMENTS 2419151 11/1975 Fed. Rep. of Germany ........ 100/31
2460464 6/1976 Fed. Rep. of Germany .... 100/19 R
2111894 10/1979 Fed. Rep. of Germany .
2441485 7/1980 France ................................ 100/11
834804 5/1960 United Kingdom ................ 100/31

Primary Examiner—Billy J. Wilhite
Attorney, Agent, or Firm—Toren, McGeady and Stanger

[57] ABSTRACT

In an apparatus for binding bales, in which a band of wire is supplied from two storage rolls, one roll supplying an upper wire and the other roll supplying a lower wire, and which includes a cutting device for cutting through the twisted wires between two twists by which the wires are connected to each, in order to assure with reliability that the twist which completes the binding does not project beyond the rear edge of the bale as viewed in the pressing direction, the distance between a lower wire guide roller and the limiting forward pressing position of a pressing plunger of a baling press in which the apparatus is incorporated is made equal to the distance between the lower guide roller and the cutting device. Also, at least one wire catching finger acts transversely upon the wires which are held taut by a binding needle of the press and between the guide rollers, in order to bring together the portions of the wires which are twisted together by a twisting device.

19 Claims, 10 Drawing Figures

APPARATUS FOR BINDING BALES IN A BALING PRESS

This invention relates to apparatus for binding bales, which are produced in a pressing duct of a baling press by means of a pressing plunger and are pressed into at least one wire band formed from wire supplied from two wire storage rolls, one storage roll supplying an upper wire which runs over two guide rollers mounted one on each side of a binding head while the other storage roll supplies a lower wire, which, in operation, is and remains connected to the upper wire by a twist, the apparatus comprising a binding needle, the path of which passes through the pressing duct and raises the lower wire behind a finished pressed bale to form a wire loop. The apparatus further comprises a binding head which includes a twisting device for producing two twists which are situated adjacent each other and connect the upper wire to the wire of the wire loop adjacent thereto, and a cutting device for cutting through the wires between the two twists.

In practice the bale is bound by a plurality of parallel wire bands. In the following description, however, for the sake of clarity, reference is made always only to one binding plane.

Such an apparatus is disclosed in British Patent 834,804. It comprises one roll of wire above and one below the pressing duct. The ends of the wires coming from the rolls are already twisted together from a previous operating cycle of the apparatus. The lower wire extends from its storage roll around the front side or leading end of the bale which is in the process of formation to the connecting twist between the wires and is guided initially just above the pressing duct by a guide roller which is disposed in the vicinity of the bale edge which faces towards the pressing plunger. After the raising of the lower wire in an open loop by the binding needle, the twisting and cutting device (hereinafter termed the twisting device) moves into its operating position and in so doing captures firstly the upper wire and then the adjacent portion of the open loop and moves them into a twisting wheel, whereupon the twisting and subsequent cutting of the wires takes place.

This apparatus operates reliably, but the twisting together of the wires, which completes the binding operation, forms a twist which is situated directly on or at least near to the upper edge of the rear end face of the finished bale. Twists which project in this position laterally from the bale present, especially with their sharp ends, a considerable risk of injury for the loading personnel when the bales are handled. Attempts to bend over the twists so that they are permanently embedded in the bale surface have not achieved any success, because they are caused to project again by becoming hooked on components of the baling press or even by the influence of the expansion of bale after it has been pressed and bound.

The object of the present invention is to provide an apparatus by which bales can be bound in such a manner that the twist between the binding wires which completes the binding operation can be caused with certainty no longer to project beyond the rear edge of the bale as viewed in the pressing direction.

To this end, according to this invention, we provide an apparatus as initially described in which the distance between the lower guide roller and the limiting pressing position of the pressing plunger is at least equal to the distance between the lower guide roller and the cutting device, and in which at least one catching finger acts transversely upon the wires which are held taut by the binding needle and between the guide rollers for the purpose of bringing together the wires which are then twisted together by the twisting device.

By these measures the result is achieved that the twist which completes the binding operation is produced at a disance at least equal to its length forward from the upper edge of the rear end face of the bale, so that, even if the twist is bent over towards the rear end face of the bale, it cannot project beyond this face. The risk of injury to persons handling the bale by the sharp ended twist is thereby overcome for example in the subsequent moving of the bale by means of fork lift trucks or cranes.

Tests carried out within plants using bales bound by the apparatus of this invention have shown that it is not a nuisance or dangerous if the ends of a twist project vertically from the top surfaces of the bales, because the twists then become covered over by the normal stacking of the bales.

By providing the apparatus of this invention with bending devices disposed one on each side of the cutting device in accordance with a preferred embodiment of the invention, it is possible in a simple manner to bend over the twists in such a way that their sharp ends point towards the surface of the bale or even become embedded in it. The principal object of the bending over of the twists in the apparatus of this invention consists, however, in that the strength of the twist connections is thereby actually increased.

Of especial importance with the apparatus of this invention is, however, that by means of it, the position of the twist which forms the completion of the binding operation and is situated in the vicinity of the rear upper edge of the bale is made at such a distance from that edge that projecting of the end of the twist beyond the rear face of the bale is reliably prevented. This safety-assuring feature of the invention is most important.

The catching finger may be constructed as a pivoted lever, which for example may be pivotally journalled about the same axis of rotation as the upper guide roller for the upper wire and may be connected to a pivoting drive. The free end of the lever is advantageously opened in the manner of a fork and is preferably provided on one external face with a run-up inclined surface for guiding the wire portions into the fork.

In a further variation, the tip of the catching finger is constructed in the manner of a barbed hook, and the catching finger executes a simple reciprocating motion for bringing in the adjacent part of the open wire loop.

The lower guide roller is preferably located just above the upper face of the bale which is about to be pressed and bound. In this way the advantage is attained that the twist, which is later produced is, during the onward movement of this bale, that is during the pressing of the next bale, pushed through beneath this guide roller and in contact with this roller. This has the effect that this twist is then bent over towards the bale surface or is indeed pushed into it. This provides an additional advantage in regard to the avoidance of risk of injury by the twist and catching of the twist into other bales.

It has also proved advantageous so to arrange the binding head that it is brought for the binding operation into an operating position and thereafter is moved into a position away from the path of the upper wire.

The object of this invention can also advantageously be achieved by a further form of embodiment, in which two catching fingers forming a catching finger pair which also operates as a twisting device, are associated with each twisting station. The catching fingers then preferably co-operate with clamping jaws to form a finger assembly, which contains as one element the catching fingers which fulfill a plurality of functions. The preferred construction of the catching fingers and thus the construction of the binding head as a whole in this embodiment as one compact unit is apparent from the subsequent description.

The aforementioned clamping jaws, which co-operate with the catching fingers, especially in the direct association with the hook-shaped ends of the fingers, lead in an advantageous manner to the bending over of the twisted wire ends, with the result not only that the strength of the twisted connections are increased but also in the majority of cases the advantage arises that the sharp ends of the twist are directed towards the upper face of the bale, i.e. even if they do not pentrate into the bale surface, at least additional protection is achieved in respect of risk of injury.

The risk of injury by projecting twists is partly alleviated by the apparatus disclosed in DE-AS No. 21 11 894 and DE-PS No. 24 60 464, in that wire loops closed by means of two parallel twist hooks are formed, but this apparatus involves over a period of time a quite considerable increase in the amountof wire used and, in the further embodiment of the twisting devices known therefrom, additional, expensive constructional measures are necessitated. As previously, the twists produced by these known devices are still situated at the rear, upper edgeof the bale and represent with the wire ends of the twists present there a risk of injury.

In detail the following may be commented in respect to the second form of embodiment of the invention:

Whereas the yoke which guides the catching fingers requires only a small movement space, the catching fingers must, when in their wire catching positions, reach beyond the adjacent wire portion of the wire loop raised by the binding needle. For this reason, the pairs of catching fingers are equipped with their own drive. This moves them from a basic starting and finishing position into the wire catching position and back again. The yoke serves, however, not only for guiding the catching fingers and positioning them to perform the twisting operation, but it also co-operates, as already mentioned, with the catching hooks during the cutting and clamping operation, For this purpose, a clamping jaw for each catching hook is fixed on the yoke and also, at a centre position between the two axes of the pair of the rotary catching fingers, a cutting blade is mounted. This blade co-operates with a counter-blade fixed to one of the clamping jaws. It is possible to carry out the wire clamping and cutting operation by means of the displacement drive for the catching fingers in such a manner that, when the basic position has been reached, the catching hooks are so pressed against the arrested yoke that the cutting of the wires and a sufficiently firm clamping are achieved. The clamping jaws then bear against the base of the catching hook mouth or, if cylindrical guide rollers are provided in the catching hooks, they bear against these rollers and on the wires guided by them. It may, however, be advantageous if, after the binding head has been brought into the basic position, a clamping and cutting device acting solely on the yoke presses the yoke and thus the cutting blade and the two clamping jaws onto the two firmly held catching hooks. During the course of the wire catching or capturing operation, as in the clamping and cutting operation, assurance must be provided by known precautions at the twisting drive that the position of the catching hooks is clearly fixed with respect to the components which co-operate with these hooks. In its basic position, the binding head is situated away from the path of the upper wire as in the catching position, in which only the catching hooks of the catching fingers move beyond the binding head.

Some examples of apparatus in accordance with the invention will now be described with reference to the accompanying drawings in which.

Figure 1:
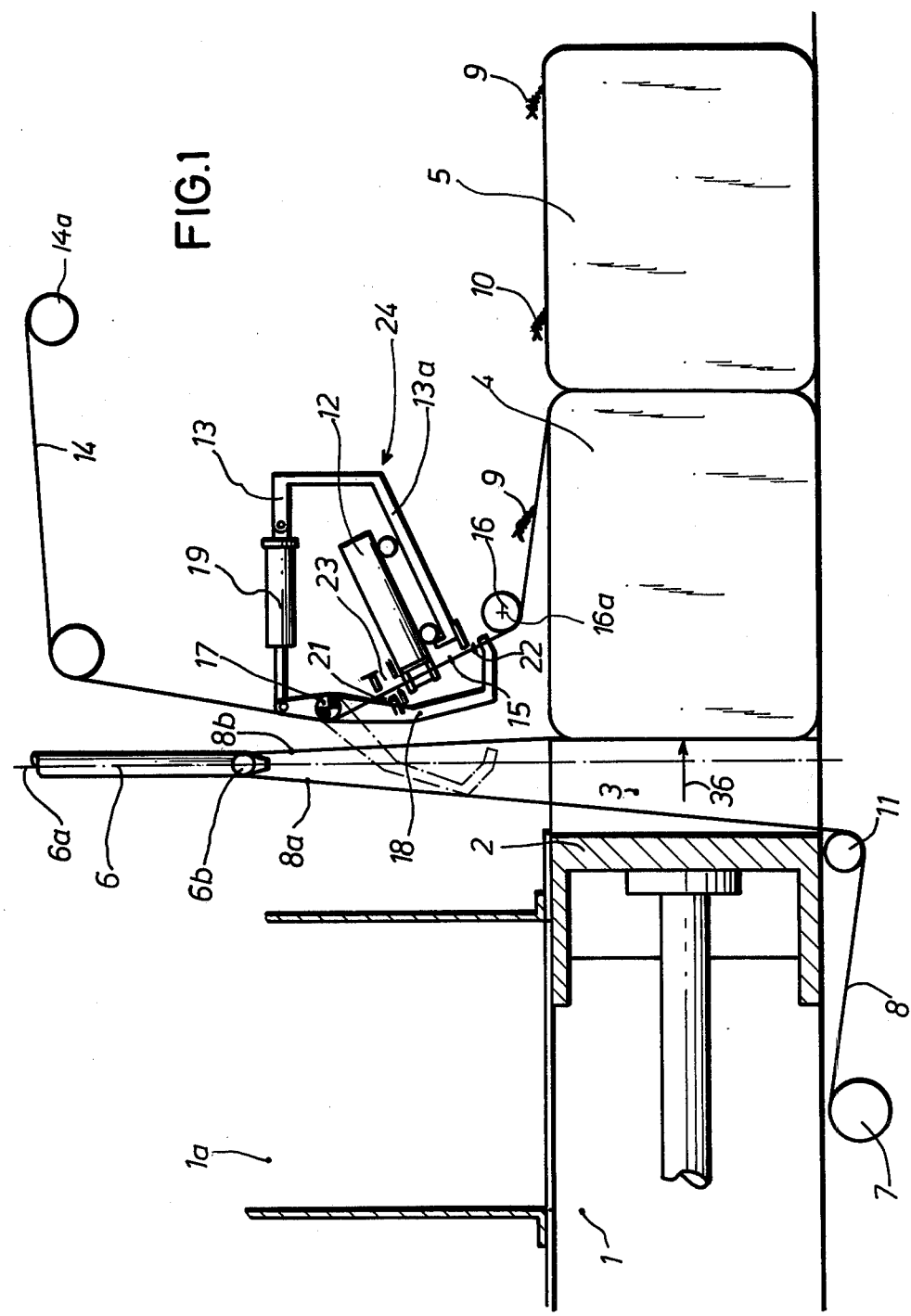
FIG. 1 is a diagrammatic side view of part of a baling press provided with a first example of a binding head having a catching finger.

A baling press comprises a pressing box 1 of rectangular section and a pressing plunger 2 which has binding grooves 3 in its front face and is reciprocable in the box 1 by means of a drive, not shown. On the pressing box 1 there is situated, in the path of movement of the pressing plunger 2 a filler shaft 1a for the material to be baled. The production of a bale 4 requires on each occasion several working strokes of the plunger until the bale 4 can be bound. In the position illustrated in FIG. 1, the bale 4 has reached its final length and is ready for binding, while a bale 5 is already bound.

Until completion of the binding operation, the pressing plunger 2 remains in its forward limiting position (illustrated by the arrow head 36) and holds together the pressed bale 4. The head of the plunger 2 possesses the aforementioned binding grooves 3, extending in a path, or movement axis, 6a of a binding needle 6. Slits which register with the grooves 3 are provided in the walls of the pressing box. The binding needle 6 descends through these slits and one of the binding grooves 3 in the head of the plunger 2 to beneath the pressing box, collects a lower wire 8, which extends from a lower storage reel 7 and runs towards the forward lower edge (in the conveying direction) of the bale 4, and forms as it is subsequently raised, an open loop 8a, 8b between a guide roller 11, the head 6b of the binding needle 6 and the lower, rear edge of the bale 4. A binding head 12 now travels, in a frame 13 and guided in a path 13a, to the left as seen in FIG. 1 into its working position, one portion 15 of an upper wire 14 supplied from a storage reel 14a, becoming located between guide rollers 16 and 17 in a twist slit of a twisting wheel 12a of the binding head 12 and being moved sufficiently far into the slit to reach the base of the twist slit.

Figure 3:
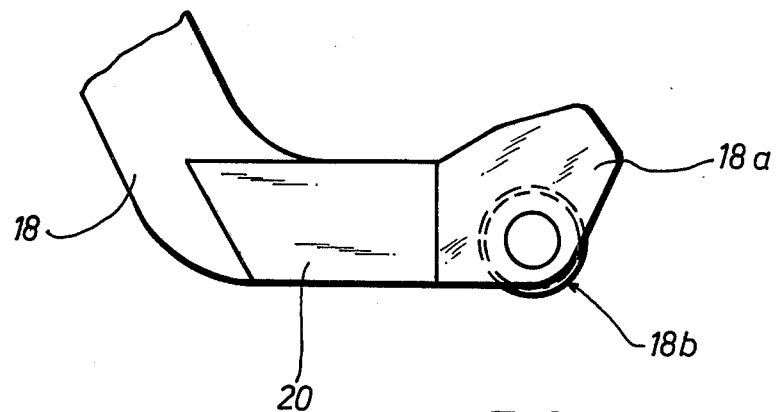
FIG. 3 is a side view to a still larger scale of the free end of a catching finger, constructed as lever and forming part of the apparatus.
Figure 4:
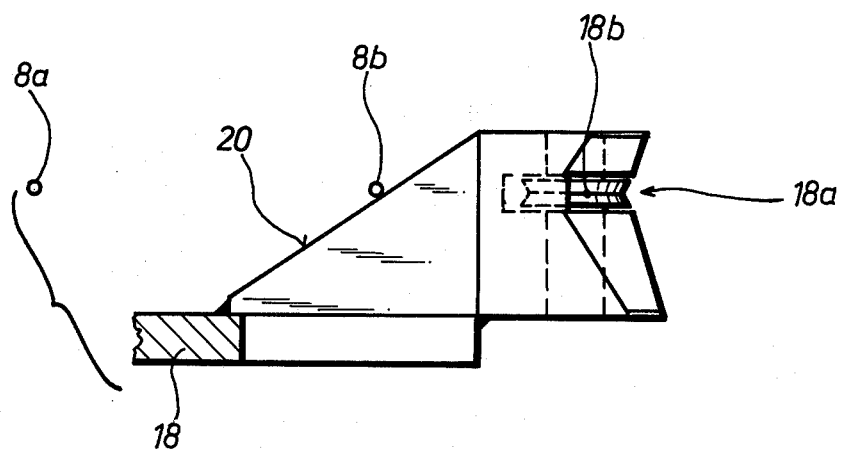
FIG. 4 is a plan view of the catching finger according to FIG. 3.

A catching finger 18, formed as a lever, is now swung by means of a drive 19 sufficiently far in the direction of the movement axis 6a of the binding needle 6 for its catching notch 18a (FIGS. 2-4) to reach behind the portion 9b of the open wire loop 8a, 8b situated adjacent to the wire portion 15 (see the chain-dotted position in FIG. 1). The finger 18 moves in a plane parallel to that determined by the wire loop 8a, 8b and at a distance from the plane of the loop which just avoids contact between the catching finger 18 and the wire portions 8a and 8b. In a preferred construction, shown in more detail in FIGS. 3 and 4, the head of the catching finger 18 with the notch 18a is offset laterally from the catching finger itself sufficiently far into the plane of the loop for the plane to pass accurately through the catching notch 18a. By means of an inclined cam surface 20 forming a transition from the shaft of the lever-shaped catching finger 18 to its head which carries the notch 18a, the result is achieved that the portion 8b of the loop 8a, 8b is deflected sideways as the catching finger 18 swings back, and then springs in front of the notch 18a, and in the forward swinging of the catching finger 18 to the right as seen in FIG. 1, towards its starting position, the portion 8b is captured by the notch 18a and also brought into the twisting slit. In an advantageous embodiment of the catching head, the catching notch 18a is of fork-shaped, and between the two arms of the fork at the base of the notch a roller 18b is so mounted that a groove of the roller 18b takes over the wire guiding.

An alternative arrangement for capturing the portion 8b of the loop 8a, 8b may be obtained by a temporary lateral displacement of the catching finger 18 during the time the finger head passes the wire portion 8b.

After the placing in the twisting slit of the two wires 8 and 14 or their portions 8b and 15, the twisting wheel 12a is set in motion, with the result that the two wire portions 8b and 15 are twisted together in opposite directions at twist positions 9 and 10 (see FIG. 2), one above and one below the twisting slit. Thereafter the wire connection is cut approximately at the centre between the two twist positions by means of a cutting device 23, and then the binding needle 6 descends to some extent.

In the form of embodiment illustrated, the apparatus of this invention also has the capability of bending over the two twists 9, 10 after they have been cut. This is done by means of two bending device 21 and 22, of which the first consists of a stationary stop 21a and an associated, movable counter-edge 21b, while the second, lower bending device 22 has a fixed stop 22a and the notch 18a of the catching finger 18 acts as its movable counter-edge. In the form of embodiment illustrated, the counter-edge 21b is also fitted to the catching finger 18, which, in order to carry out the bending operation after the cutting operation is swung temporarily by a sufficient amount counter-clockwise from its at-rest position. Thereafter the catching finger 18 and the binding head 12 return again to their starting positions.

During the return of the pressing plunger 2 to receive the first batch of material for the next bale 4, the now bound bale 4 expands somewhat, causing the binding wire to be tensioned. This has the effect that the lower twist 10 bears firmly against the upper face of the bale.

The finished bale 4 is pushed onwards during pressing of a new bale, the twist 10 then being guided through beneath the guide roller 16. Consequently, the additional possibility arises of pressing the sharp end of the twist 10, if desired, by suitable guidance into the surface of the bale. The upper twist 9 becomes stretched, as the new bale following the bale 4 increases in length and finally also comes to rest after passing beneath the roller 16 upon the upper face of the bale. The next binding operation commences as soon as the new bale has reached its intended size.

Figure 2:
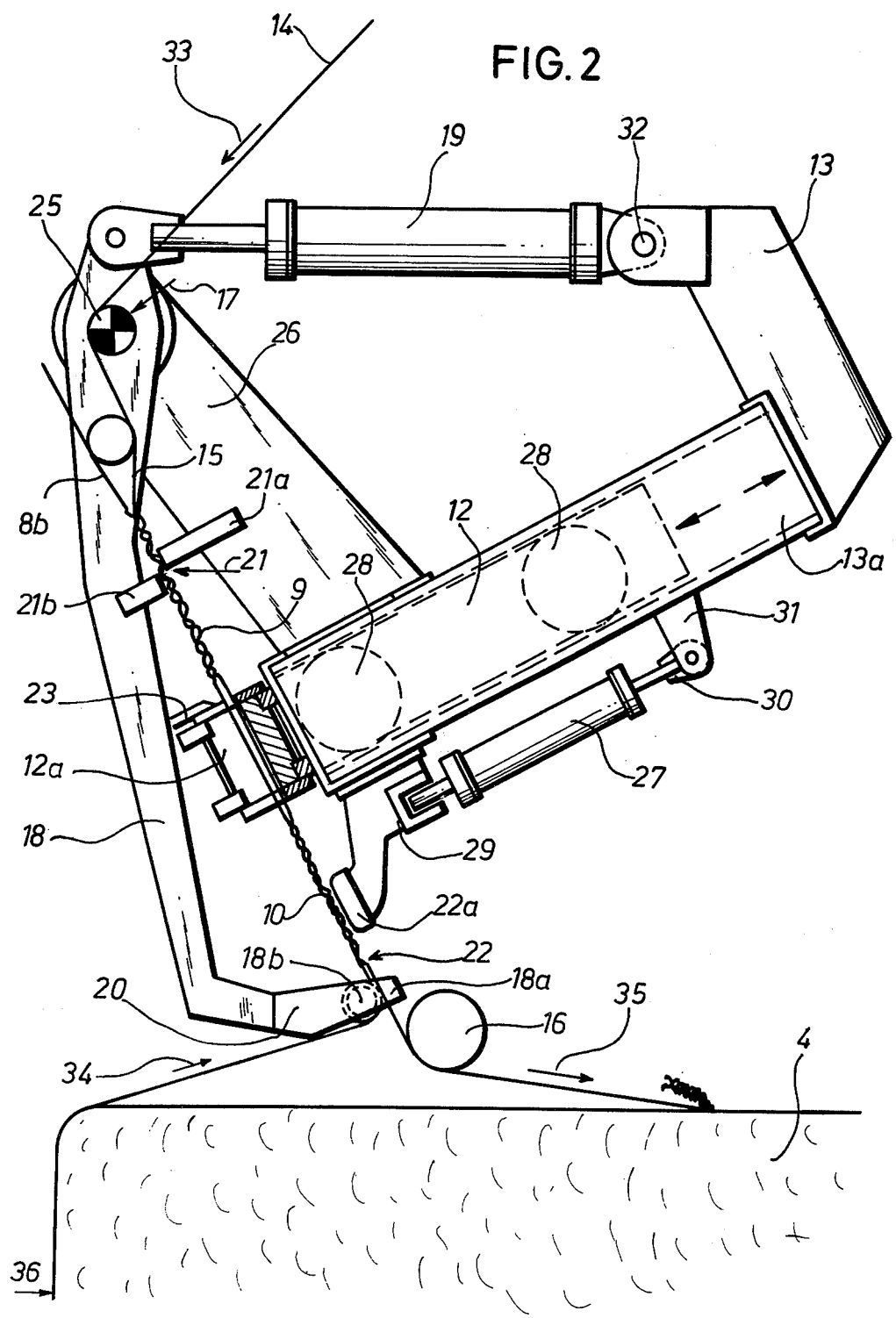
FIG. 2 is an enlarged view of the binding head according to FIG. 1, but shown after a wire twisting operation has been completed.

In FIG. 2, the entire apparatus 24, comprising the binding head with drives and support devices, is illustrated diagrammatically. The frame 13 acts as a support frame and is rigidly connected, in a manner not shown, with the frame of the baling press. A part of the frame 13 is of a laterally open U-section to form a guide path for the binding head 12. Apart from the binding head 12, the apparatus 24 comprises the catching finger 18, which is pivotally fixed in a bearing 25 coaxially with the upper guide roller 17 to a cross-beam 26 of the frame 13 and is formed as a lever, the rollers 16 and 17 limiting the extent of the twist, the bending over devices 21 and 22, the cutting device 23, a hydraulic cylinder 27 forming a drive for the binding head 12 and a hydraulic cylinder 19 forming a pivoting drive for the catching finger 18.

The binding head 12 is guided by means of rollers 28 in the guide track 13a. Its travel distance is so dimensioned that the upper wire 14 reliably moves clear of the binding head when the binding head is in its at-rest position, whereas the working position is so adjusted that the wire portion 15 touches the base of the twisting slit in the twisting wheel 12a. The hydraulic cylinder 27 bears against an abutment 29 on the guide track 13a, which forms part of the frame 13. Its piston rod is connected by its head 30 to a lug 31, which is fixed to the binding head 12. The cylinder 27 then moves the binding head 12 through the lug 31. The pivotal drive 19 for the catching finger 18 is pivotally connected at 32 to the frame 13.

The directional arrows 33, 34 and 35 shown in FIG. 2 designate the direction of travel of the wires 8 and 14 during operation of the baling press and binding apparatus.

A second example of the apparatus is described below with reference to FIGS. 5 to 10 in which the baling press corresponds substantially to that shown in FIG. 1. That is to say it comprises a pressing box 101 of rectangular cross-section, a pressing plunger 102 having binding grooves 103 in its end face, a filler shaft 101a, binding needles 106 and at least one lower storage reel 107 for the lower wire 108 with a guide roller 111. An upper wire 114 is supplied from a storage reel 131. The sequence of working operations is also substantially the same and will be described below for the second example of embodiment once again in detail with reference to FIGS. 5 to 7. The construction of the second form of embodiment of the binding head will first be explained with reference to FIGS. 8 to 10.

Figure 8:
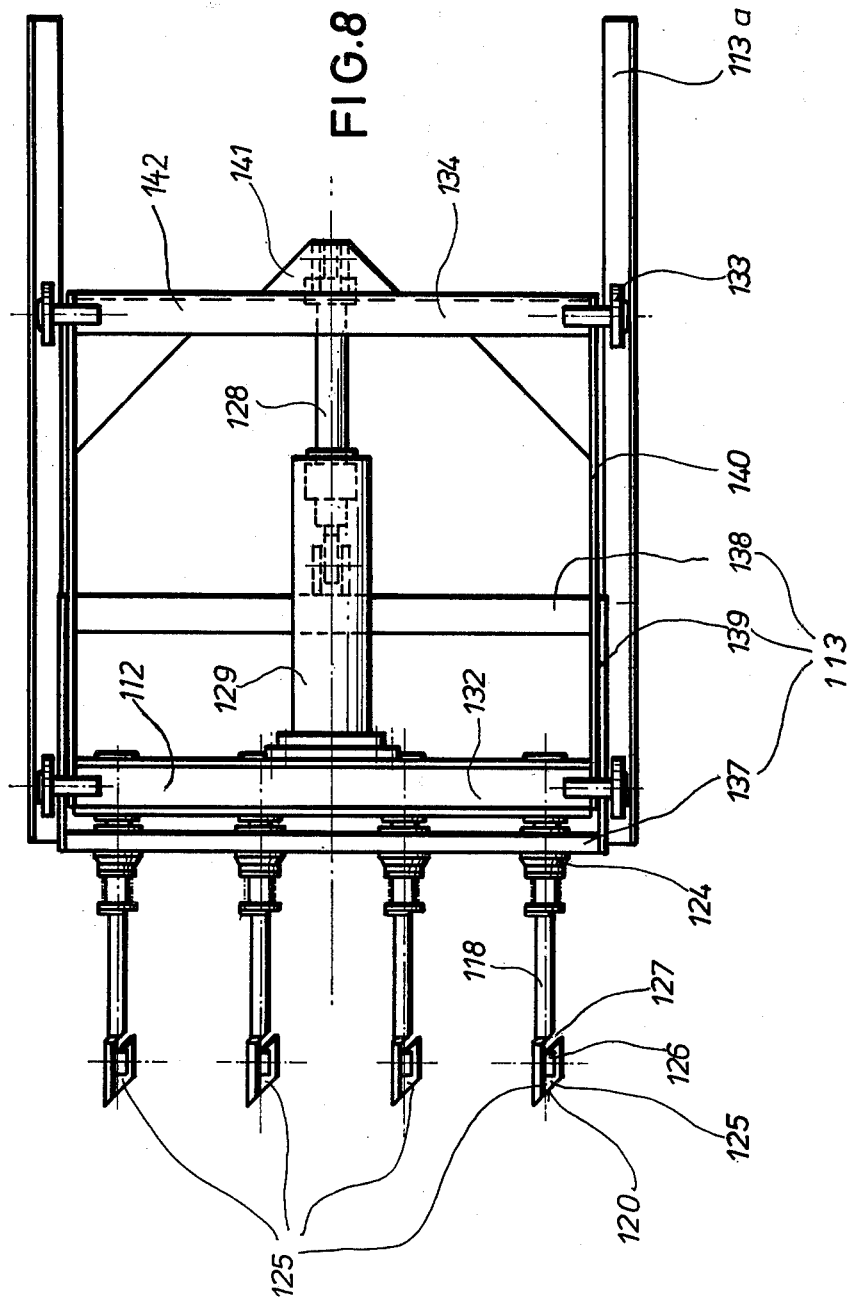
FIG. 8 is a diagrammatic plan view showing four binding heads disposed alongside one another.

FIG. 8 shows in plan a binding apparatus comprising a binding head 112 with four pairs of catching hooks 125 on catching fingers 118, which are thus capable of the simultaneous production of four parallel wire binding bands around each bale. As seen in FIG. 8 the two hooks of each pair are situated one above the other, so that only one is visible. In a cross-beam 137, four yokes 124 are so fixed at uniform spacings that they can be moved jointly by a single clamping and cutting cylinder 128. The cross-beam 137 together with a transverse member 138 and longitudinal members 139 constitute a first frame 113, which is movable independently of a second frame 142, which consists of a drive box 132 serving as cross-beam, a rear cross-beam 134 and two longitudinal members 140. The clamping and cutting cylinder 128, which acts on the transverse member 138, bears against a plate 141 connected to the cross-beam 134. The second frame 142, consisting of the drive box 132, the rear cross-beam 134 and the two longitudinal members 140, can be moved on rollers 133 in guide rails 113a, which are oriented at an acute angle to the horizontal, and this move is effected by means of a displacement drive 119. The drive box 132 has, for guiding each catching finger 118 in a straight line, a bearing, which receives the rear end of each catching finger 118 and is disposed coaxially with guide bores 135 in the yokes 124. Approximately at the centre of the drive box 132 a twist drive 129 which is common to the four binding heads is disposed on its rear face. The drive 129 is connected in known manner with the individual catching fingers, for example by toothed wheels or toothed belts, it being necessary to ensure, however, in order to provide trouble-free operation, that when the catching hooks are situated in their at-rest positions they adopt in both limiting positions strictly equal positions which correspond either to that illustrated in FIG. 8 or to a position rotated therefrom through 180° about the catching finger longitudinal axes. In this way both reliable capturing of the wires 108b and 115 and also trouble-free releasing of the finished twists 109 and 110 are assured.

Figure 9:
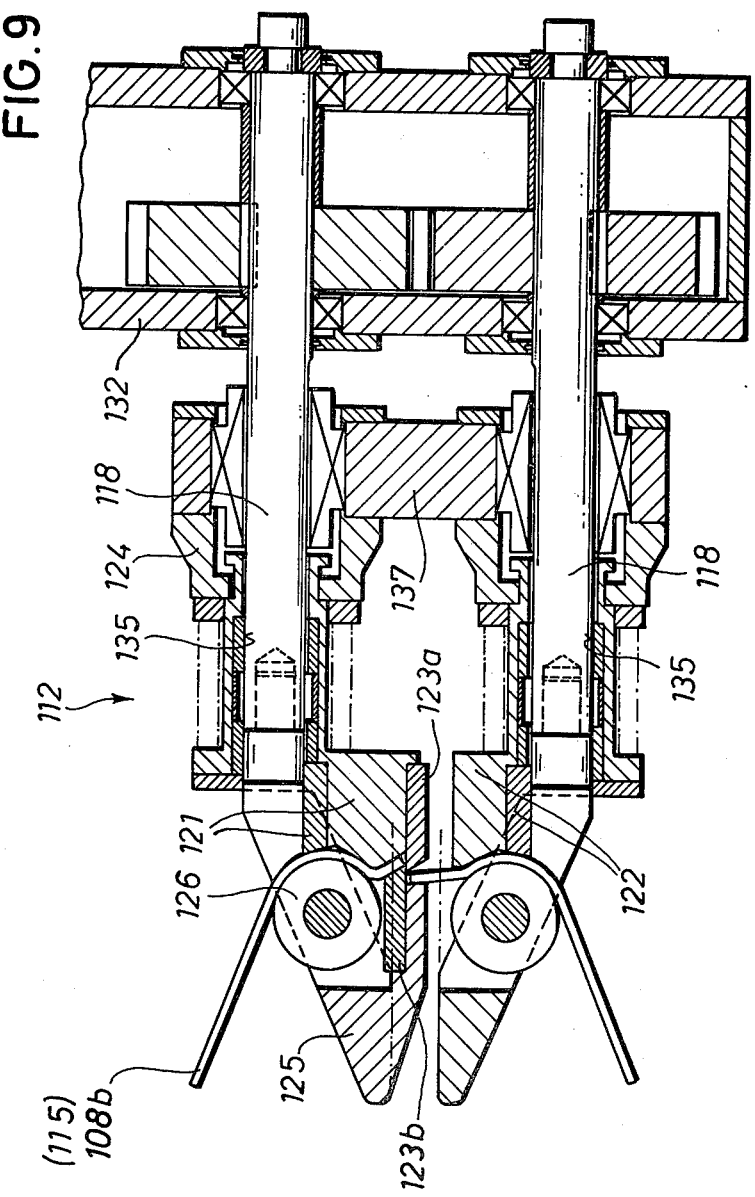
FIG. 9 is a vertical section to a larger scale through a binding head according to this invention; and, FIG. 10 is a plan view to a still larger scale of a catching hook at the head of a catching finger.

FIG. 9 shows a vertical section through one of the binding heads 112 of the second example. The yoke 124 comprises a forward part having clamping jaws 121 and 122 firmly seated thereon and a cutting blade 123a, which, during the cutting of the wires 108b and 115, co-operates with a counter-blade 123b which is fixed to only one of the two catching hooks 125 of one binding head 112. The yoke also comprises a rear part which has a bearing for longitudinal and rotational movement of the head 112. In the example illustrated in FIGS. 5 to 10 this extends as far as the forward part of the yoke and is constructed in a conventional manner, for which reason details of the bearing construction are not described.

Each catching finger 118 consists of a cylindrical component mounted in the guide bores 135 and of a catching hook 125 comprising a run-up inclined surface 120 and a wire guide roller 126. One of the catching hooks 125 of one binding head 112 carries the counter-blade 123b, which partakes of its rotation in the twisting operation. FIG. 9 shows the catching hooks 118 in the clamping and cutting position and clearly illustrates the function of the cutting apparatus and clamping jaws.

Figure 10:
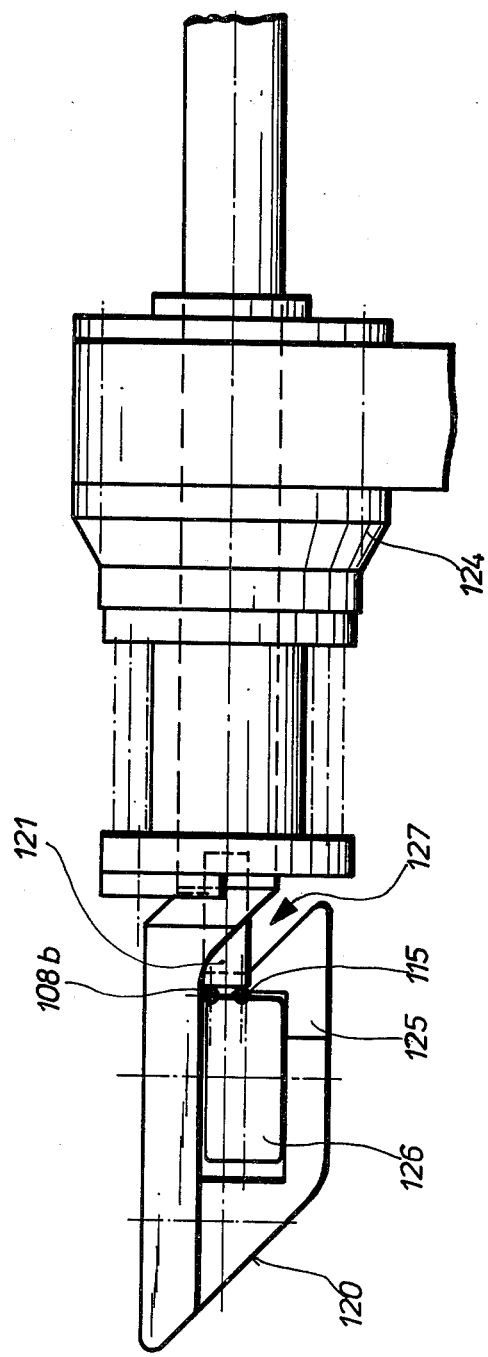

Finally, FIG. 10 shows a catching hook 125 in a position perpendicular to the plane of the wire loop after capturing of the two wires 108b and 115. This FIG. enables one to see how the two wires become situated in the hook mouth 127 and are guided on a roller 126 and are held by means of a clamping jaw 121.

Figure 5:
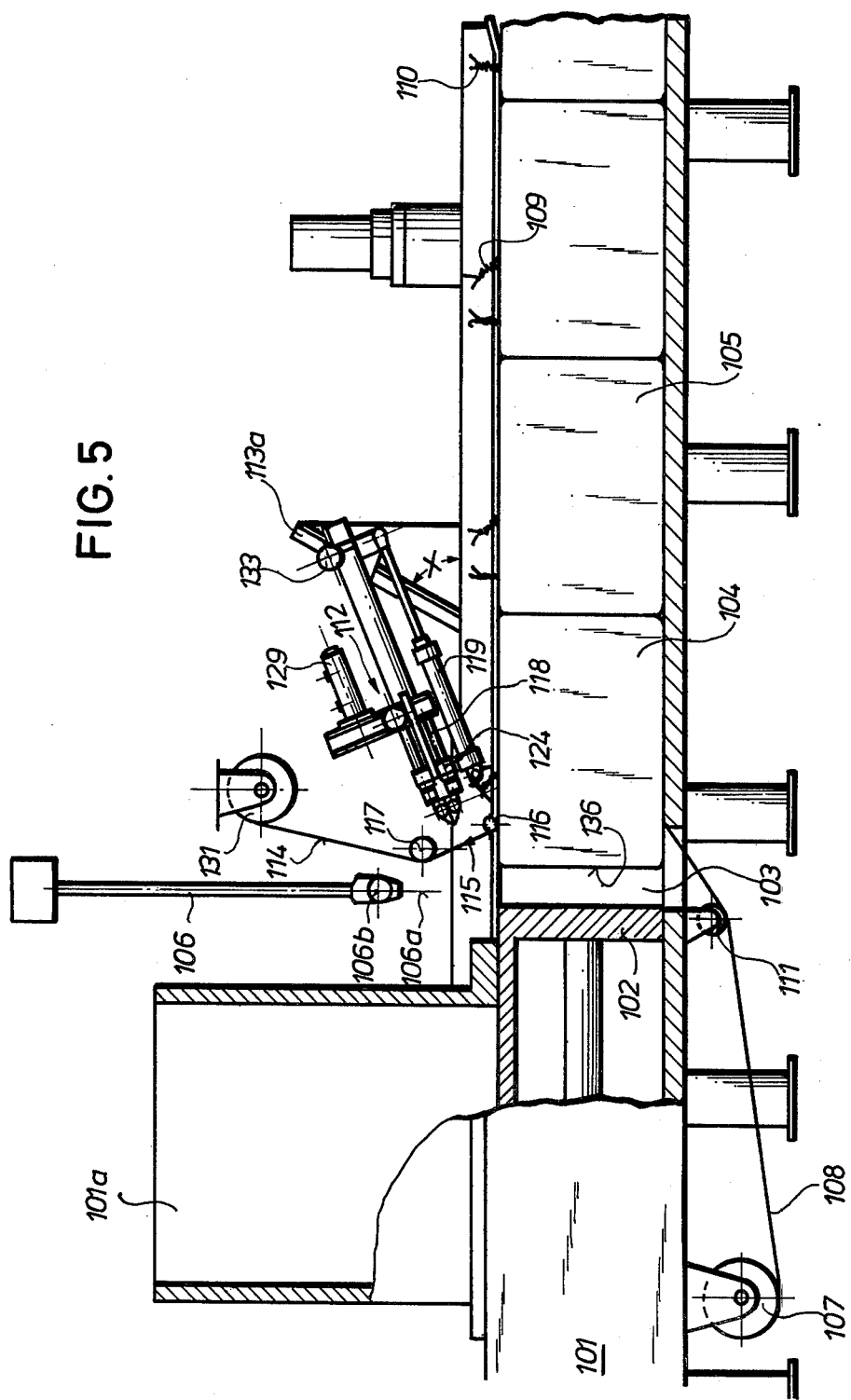
FIG. 5 is a diagrammatic side view of a baling press provided with a second example of a binding head which is shown in its starting position.
Figure 6:
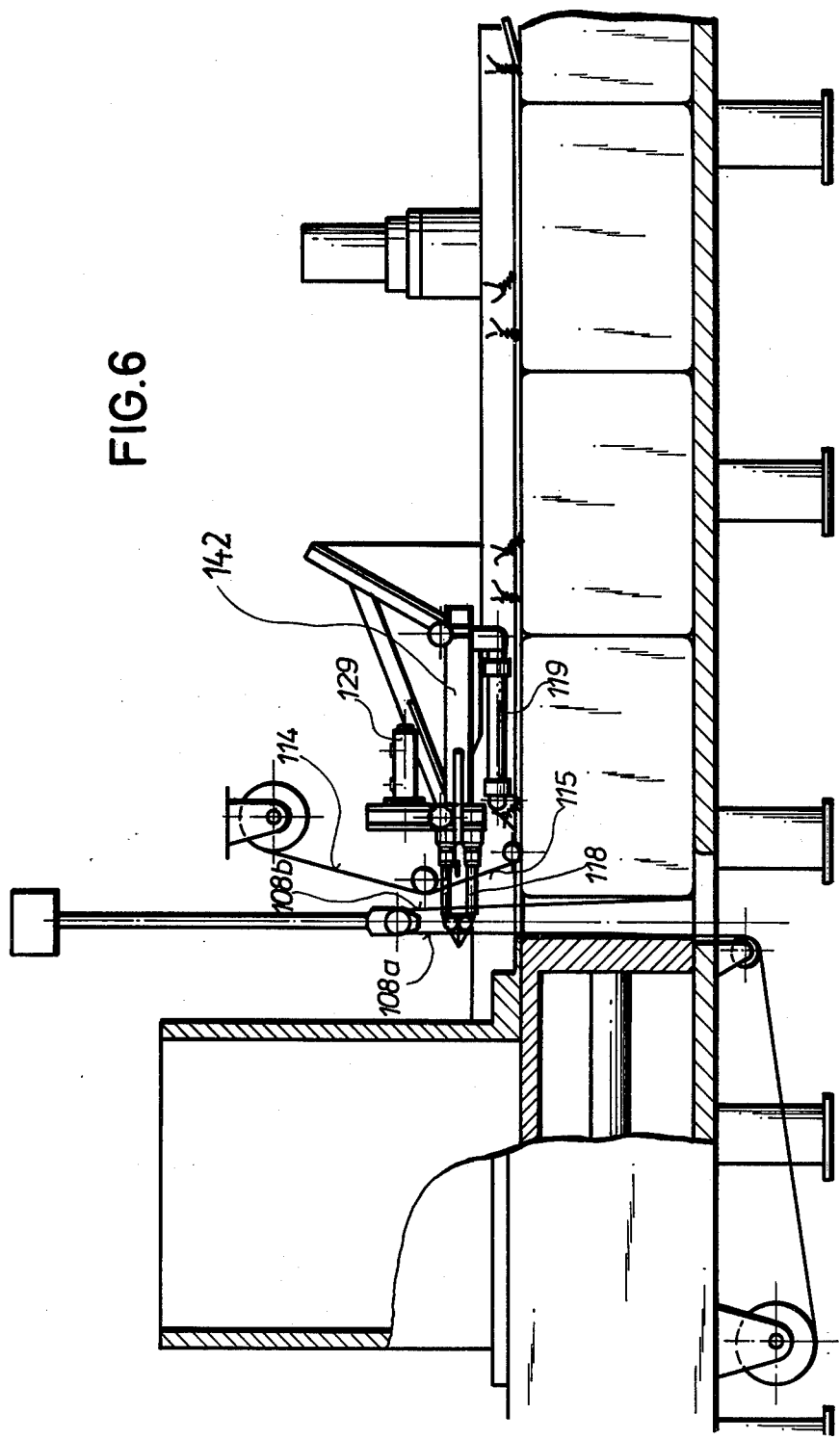
FIG. 6 is a view similar to FIG. 5, but showing the binding head in a position in which it captures the wire.
Figure 7:
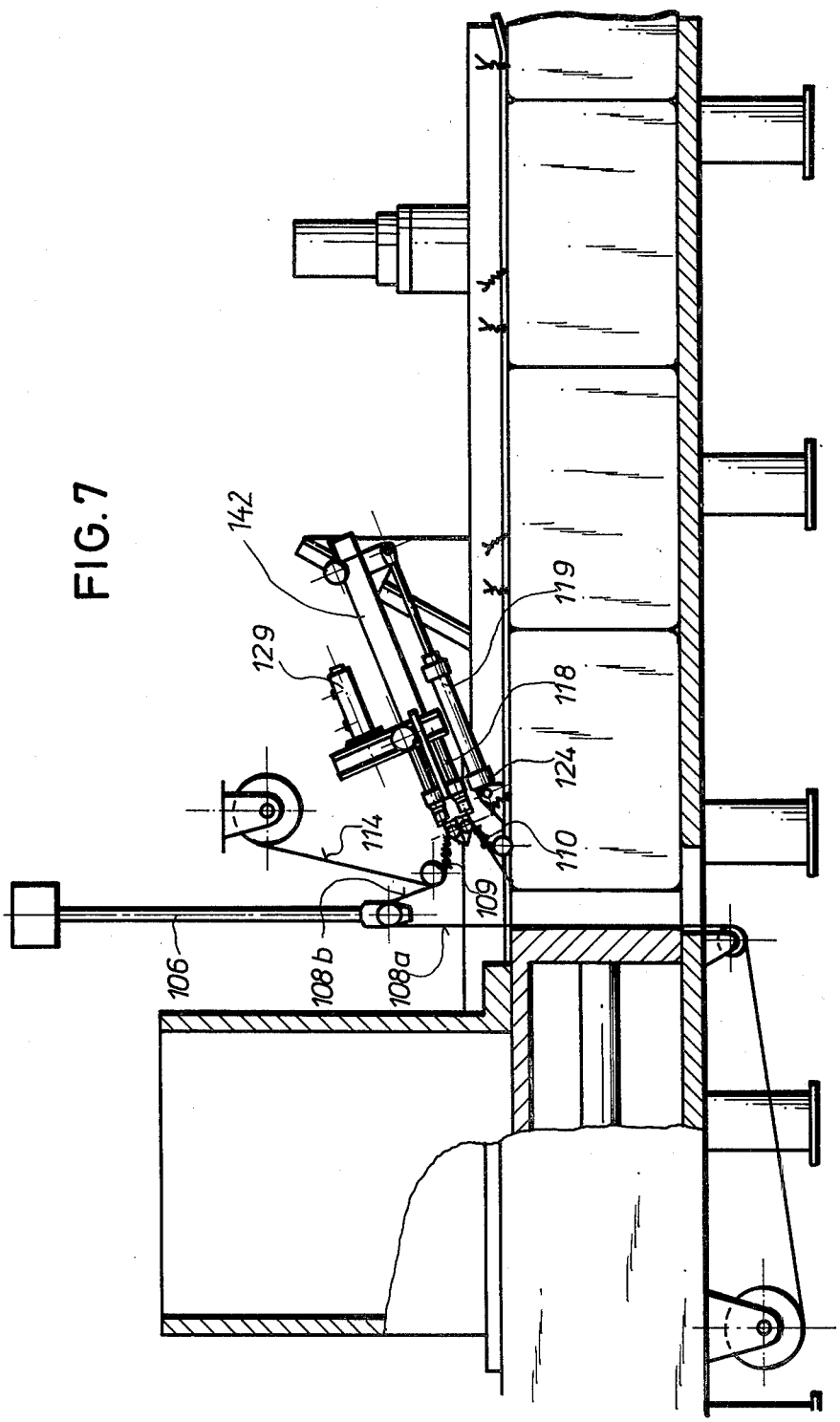
FIG. 7 is a view similar to FIG. 5, but showing the binding head in a wire twisting position.

The binding head 112 operates as follows:

As in the previously described example, the pressing plunger 102 remains in its forward limiting position until completion of the binding operation and holds together the material of the pressed bale 104. Also as in the first example, as shown in FIGS. 5 and 6, the lower wire 108 coming from the lower storage reel 107 is raised by the binding needle 106 upwards beyond the upper edge of the bale to form an open loop 108a, 108b. The succeeding sequence of operations differs, indeed not basically, but in the details apparent from the following description on account of the somewhat different construction, from the sequence of operations described in connection with the first example of the binding head 12.

According to FIG. 6, after the open loop 108a, 108b has been formed, the binding head 112 on the second frame 142, driven by the displacement drive 119, is moved along the track 113a to the left into the catching position, the yoke 124, however, being stopped positively to the right of the wire portion 115 of the upper wire 114. The catching hooks 125 of the catching fingers 118 are moved onwards sufficiently far towards the path 106a of the binding needle 106 for the openings of the hook mouths 127 to reach behind the nearest portion 108b of the open wire loop 108a, 108b. In doing this they move in or parallel to the plane determined by the wire loop 108a, 108b. In the example illustrated, the catching hooks 125 of the catching fingers 118 lie with their hook mouths 127 in the plane of the loop. The lateral deflection of the wires 108b and 115 as the catching hooks move into the catching position is facilitated by the run-up inclined plane 120 at the forward side of each catching hook 125. The laterally displaced wires 108b and 115 spring back into the mouths of the hooks and become situated in the base of the hook on the wire guide roller 126.

After the wire portion 108b of the open wire loop 108a, 108b has sprung into the hook mouth 127 of the two catching fingers 118 disposed parallel to each other in the plane of the wire loop, the binding head 112 is moved back into its starting position. The laterally displaced wire 115 now also springs back into the mouths of the hooks, so that the two wire portions 108b and 115 now become situated at the base of the two hook mouths 127. As soon as the starting position has been reached, up to which instant in the example illustrated the clamping jaws 121, 122 and the cutting device 123a, 123b have still not come into action, the clamping and cutting drive, in the case illustrated a hydraulic cylinder 128 (FIG. 8), comes into operation. The cutting device 123a, 123b cuts through the two wires 108b and 115 and virtually simultaneously the two clamping jaws 121 and 122 bear on the wires 108b and 115 lying around the guide rollers 126 and press these wires onto the guide rollers 126, so that they are firmly held. Thereafter the twisting drive 129 is brought into action, causing the two twists 109 and 110 to be produced synchronously, but separately. By releasing of the clamping and cutting drive 128, the two twists 109 and 110 are then released.

In a simplified form of embodiment the catching, cutting and clamping operation may also be carried out with only one drive, for example the catching finger drive 119. In this case, the cutting and clamping of the wires may be effected when the basic starting and finishing position is reached, after which the twist drive is then actuated. It is only necessary to ensure that following on the twisting operation the two twists are released.

We claim:

1. In a baling press for producing bound bales of pressed material, said press comprising a pressing duct, a pressing plunger reciprocable in said duct between rear and forward end positions for pressing bales successively in said duct and binding means for forming at least one wire band around said bale, said bale being pressed forwards by said plunger, into a loop of said wire, said binding means including a first storage roll for delivering an upper wire, a binding head, first and second guide rollers for guiding said upper wire, means journalling said guide rollers, the second above and the first below said binding head, a second storage roll for delivering a lower wire which in operation of said binding means remains connected to said upper wire by a twist, a reciprocable binding needle which reciprocates along a path which passes through said duct and in operation raises said lower wire to form a wire loop behind a finished bale pressed in said duct, said binding head including a twisting device for producing two twists between said upper wire and a portion of said loop adjacent said upper wire and a cutting device for cutting said wire between said two twists, the improvement wherein the distance between said first guide roller and said forward position of said plunger is at least equal to the distance between said first guide roller and said cutting device and wherein said binding means includes at least one catching finger and means for moving said finger to act transversely upon said upper wire and said portion of said lower wire while said upper wire is held taut between said first and second guide rollers and said loop is held taut by said binding needle, said finger being operative to bring together said upper wire and said portion of said loop prior to the production of said twists by said twisting device.

2. A baling press as claimed in claim 1, wherein said catching finger acts on said upper wire and said portion of said lower wire in a position between said first guide roller and said binding head to bring together said upper wire and said portion of said loop for the production of said twists, said finger moving between limiting positions in a zone between a vertical plane containing said binding needle and a vertical plane containing the axis of rotation of said first guide roller.

3. A baling press as claimed in claim 1, wherein said catching finger comprises lever means, means pivotally mounting said lever means for movement about an axis of rotation co-axial with an axis of rotation of said second guide roller, and drive means for moving said lever means pivotally to and fro.

4. A baling press as claimed in claim 1, wherein said catching finger includes catching hook means for receiving said upper wire and said portion of said loop and means defining an inclined cam surface for guiding said upper wire and said portion of said loop into said hook means.

5. A baling press as claimed in claim 1, wherein said catching finger includes at the tip thereof barbed hook means for receiving said upper wire and said portion of said loop.

6. A baling press as claimed in claim 1, in which said binding means further comprises two bending means for bending said twists after said wires have been cut by said cutting device, and means mounting one of said bending means above said binding head and means mounting the other of said bending means below said binding head.

7. A baling press as claimed in claim 1, wherein said first guide roller is located just above the upper face of a bale which is about to be pressed and bound in said pressing duct.

8. A baling press as claimed in claim 1, further comprising means movably mounting said binding head for movement between an operative position adjacent said upper wire and said portion of said loop and an inoperative position remote from said upper wire and said portion of said loop.

9. A baling press as claimed in claim 1, further comprising a second catching finger, said catching finger and said second catching finger forming a pair and means for rotating each of said catching fingers of said pair to produce said twists, whereby said catching fingers of said pair and said rotating means together form said twisting device.

10. A baling press as claimed in claim 9, further comprising wire clamping jaws and means for moving said clamping jaws to clamp said upper wire against one of said catching fingers of said pair and to clamp said portion of said loop against the other catching finger of said pair.

11. A baling press as claimed in claim 10, wherein said pair of catching fingers each comprise a cylindrical shaft, a catching hook extending from one end of said shaft, means mounting said shafts parallel to each other for axial and rotational movement and drive means for effecting both rotational and axial movement of said shafts.

12. A baling press as claimed in claim 11, further comprising a single rotating and displacing drive means for rotating and displacing both of said catching fingers of said pair.

13. A baling press as claimed in claim 12, further comprising a yoke, means for moving said yoke, means operatively connecting said clamping jaws to said yoke, means mounting a cutting blade between said catching fingers of said pair and means mounting said catching fingers parallel to each other to said yoke, said mounting means being disposed such that the longitudinal axes of said fingers lie substantially in a plane containing said upper wire and said portion of said loop.

14. A baling press as claimed in claim 13, in which said mounting means includes means defining two bores in said yoke, said bores having axes which are parallel to each other and each bore holding one of said catching fingers of said pair.

15. A baling press as claimed in claim 14, in which each of said catching hooks includes means defining a forward surface and a hook mouth, said forward surface including an inclined surface which is offset laterally from said hook mouth and is adapted to guide said upper wire and said portion of said loop, which lie in a plane containing the axes of said shafts, into said hook mouths.

16. A baling press as claimed in claim 15, further comprising a guide roller and means rotatably mounting said roller in said hook mouth of each of said catching fingers.

17. A baling press as claimed in claim 16, wherein said clamping jaws are adapted to co-operate with said guide rollers in said hook mouths, and said cutting blade is mounted on one of said clamping jaws and co-operates with a counter blade mounted on the tip of one of said catching fingers, said cutting blade and said counter blade forming said cutting device.

18. A baling press as claimed in claim 17, further comprising means for moving said binding head between a basic position and a catching position in which said catching fingers are adapted to catch said upper wire and said portion of said loop.

19. A baling press as claimed in claim 18, wherein said clamping jaws, said cutting device and said twisting device are operative when said binding head is in said basic position.

* * * * *